US009036542B2

(12) United States Patent
Li et al.

(10) Patent No.: US 9,036,542 B2
(45) Date of Patent: May 19, 2015

(54) METHOD FOR FEEDING BACK ACK/NACK FOR DOWNLINK DATA TRANSMISSION IN RADIO COMMUNICATION SYSTEM

(75) Inventors: Yingyang Li, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 13/023,536

(22) Filed: Feb. 8, 2011

(65) Prior Publication Data

US 2011/0194443 A1 Aug. 11, 2011

(30) Foreign Application Priority Data

Feb. 8, 2010 (CN) .......................... 2010 1 0113680

(51) Int. Cl.
H04W 28/06 (2009.01)
H04L 1/18 (2006.01)
H04L 1/16 (2006.01)
H04L 5/00 (2006.01)

(52) U.S. Cl.
CPC ............ *H04L 1/1861* (2013.01); *H04L 1/1621* (2013.01); *H04L 5/0053* (2013.01)

(58) Field of Classification Search
None
See application file for complete search history.

(56) References Cited

U.S. PATENT DOCUMENTS 8,514,883 B2 * 8/2013 Pan et al. ...................... 370/468
2009/0300456 A1 * 12/2009 Pelletier et al. ............... 714/749

* cited by examiner

*Primary Examiner* — Alex Skripnikov
(74) *Attorney, Agent, or Firm* — Jefferson IP Law, LLP

(57) ABSTRACT

Embodiments of the present invention provide a method for feeding back ACK/NACK for downlink data transmission in a radio communication system. The method is applied on a mobile terminal and includes the following steps: receiving downlink data, calculating, with respect to each Compenent Carrier (CC), a number of ACKs of ACK/NACK information of downlink data sub-frames of the CC, and feeding back numbers of ACKs of the ACK/NACK information of the downlink data sub-frames of CCs.

24 Claims, 3 Drawing Sheets

METHOD FOR FEEDING BACK ACK/NACK FOR DOWNLINK DATA TRANSMISSION IN RADIO COMMUNICATION SYSTEM

PRIORITY

This application claims the benefit under 35 U.S.C. §119 (a) of a Chinese patent application filed on Feb. 8, 2010 in the Chinese Intellectual Property Office and assigned Serial No. 201010113680.x, the entire disclosure of which is hereby incorporated by reference.

BACKGROUND OF THE INVENTION

1. Field of the Invention

The present invention relates to radio communication systems, and more particularly, to a method for feeding back ACK/NACK for downlink data transmission in a radio communication system, so as to support data transmission based on HARQ in the radio communication system.

2. Background of the Invention

The Long Term Evolution system of the 3GPP standard organization supports two duplex modes including Frequency Division Duplex (FDD) and Time Division Duplex (TDD). FIG. 1 is a schematic diagram illustrating a frame structure of an LTE TDD system. The length of each radio frame is 10 ms which is equally divided into two 5 ms half-frames. Each half-frame includes 8 slots with length of 0.5 ms and 3 special slots, i.e. a Downlink Pilot Slot (DwPTS), a Guard Period (GP) and an Uplink Pilot Slot (UpPTS). The total length of the 3 special slots is 1 ms. Each half-frame consists of 2 consecutive slots, i.e. the $k^{th}$ sub-frame includes slot $2k$ and slot $2k+1$. The LTE TDD supports 7 uplink-downlink configurations, as shown in table 1. Herein, D denotes a downlink sub-frame, U denotes an uplink sub-frame and S denotes the 3 special slots in the special field.

TABLE 1

Uplink-downlink configurations of the LTE TDD

| Index of configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The LTE system transmits data based on Hybrid ARQ (HARQ). A data receiver transmits ACK or NACK information based on whether the data is corrected received. Scheduling of dynamic downlink data transmission is implemented via a Physical Downlink Control Channel (PDCCH). Each PDCCH may include 1, 2, 4 or 8 Control Channel Elements (CCEs) and each CCE is mapped to one ACK/NACK channel. Thus, a PDCCH which includes multiple CCEs is actually mapped to multiple ACK/NACK channels. In the LTE system, the ACK/NACK channel used for transmitting ACK/NACK information is implicitly determined by a CCE which has a smallest index among all CCEs constituting the PDCCH. Except for Semi-Permanent Scheduling (SPS), no PDCCH is required to be transmitted during initial transmission of downlink data, and the ACK/NACK channel used for feeding back the ACK/NACK information is configured semi-statically. The re-transmission of the downlink data is implemented via PDCCH scheduling. Similarly as the dynamic scheduling, the ACK/NACK channel used for feeding back the ACK/NACK information is determined by the PDCCH. The ACK/NACK feedback signal of the HARQ transmission of the downlink data is transmitted on the ACK/NACK channel of the Physical Uplink Control Channel (PUCCH).

In the LTE system, there are multiple methods for feeding back ACK/NACK information. The first method transmits ACK/NACK feedback information of only one downlink sub-frame on one uplink sub-frame. This method is applicable for FDD and some TDD uplink-downlink configurations. When MIMO is not adopted for data transmission, 1 bit of ACK/NACK information is generated, while when MIMO is adopted, 2 bits of ACK/NACK information are generated. The second method is to bundle ACK/NACK feedback information of multiple downlink sub-frames as 1 or 2 bits, so as to transmit the ACK/NACK information using the same method as the first method. This method is only applicable for TDD system. The bundling operation herein is working on codeword, i.e. bundle ACK/NACK information of codewords having the same index of the downlink sub-frames having data transmitted as one piece of ACK/NACK information. The third method is to transmit ACK/NACK feedback information of multiple downlink sub-frames in one uplink sub-frame. The data transmission of each downlink sub-frame generates one piece of ACK/NACK information. Then, the multiple bits of ACK/NACK information are transmitted on an ACK/NACK channel among multiple ACK/NACK channels based on QPSK modulation. In the LTE system, the number of bits may be 2, 3 and 4. This method is applicable for only the TDD system.

In the LTE system, the downlink data transmission is dynamically scheduled by PDCCH. But a UE may be unable to correctly receive the PDCCH transmitted by a base station. Thus, in the LTE TDD, when it is required to transmit ACK/NACK information of multiple downlink data sub-frames in one uplink sub-frame, a scheme is necessitated to enable the UE to detect whether the PDCCH of one or more downlink sub-frames is lost. In order to realize this function, in the LTE TDD, the PDCCH includes a field of 2 bits, referred to as Downlink Assignment Index (DAI). The DAI is used to indicate that how many downlink sub-frames in which the base station has transmitted PDCCH up to a current downlink sub-frame within N (N is larger than 1) downlink sub-frames associated with one uplink sub-frame. The changing order is 1, 2, 3 and 4. For example, if the UE receives two PDCCHs and their DAI values are respectively 1 and 3, the UE may determine that a PDCCH with DAI value of 2 is lost. In addition, the DAI cannot detect the situation where the last several PDCCHs are lost. For example, in the above example, the UE is unable to determine whether the base station has transmitted a PDCCH with DAI value of 4. As to the second method for feeding back the ACK/NACK information, it is defined that the UE feeds back the ACK/NACK information on an ACK/NACK channel determined by a last sub-frame of the PDCCH it receives. In this method, the base station may know whether the UE has lost the PDCCH of the last one or last multiple sub-frames based on the ACK/NACK channel actually occupied.

Since the DAI is unable to detect the situation where the last several PDCCHs are lost, in the LTE TDD, another method is adopted to indicate the ACK/NACK information when it is required to transmit the ACK/NACK and a Scheduling Request (SR) at the same time or when it is required to transmit the ACK/NACK and a Channel Quality Indicator (CQI) at the same time. What is fed back is the number of ACKs in the ACK/NACK information of each downlink data the UE received. Suppose the number of downlink sub-frames is M. Then, the number of ACKs indicated by this method is 0, 1, . . . , M. The number 0 is also used to indicate that the UE detect a situation where at least one downlink data is lost. In this method, the base station can determine whether the UE has correctly received all the downlink data based on the number of downlink data the base station actually transmitted and the number of ACKs the UE reported, and then can transmit new data or perform re-transmission.

In order to support higher data rate, in LTE-Advance (LTE-A) system, multiple Compenent Carriers (CCs) are aggregated to obtain larger working bandwidth for downlink and uplink of the communication system, i.e. Carrier Aggregation (CA). For example, five 20 MHz CCs may be aggregated to support a 100 bandwidth.

As to the LTE-A, there is a method for feeding back ACK/NACK based on multi-code transmission. Suppose the UE receives downlink data on N CCs at the same time, and each downlink data corresponds to one ACK/NACK channel. Then, the UE transmits ACK/NACK information on the N ACK/NACK channels at the same time, and the ACK/NACK feedback information of each downlink data is transmitted on the ACK/NACK channel corresponding to this downlink data. This method is a simple extension to the LTE processing method. But it has a deficiency that multiple ACK/NACK channels are occupied in parallel, which destroys the single-carrier characteristic of the uplink signal and thus brings out a higher Cubic Measurement (CM). And the larger the number of the ACK/NACK channels transmitted in parallel, the larger the value of the CM. At the same time, the transmission power of the UE is divided onto multiple ACK/NACK channels, which restricts the coverage are of the uplink signal.

The present invention provides a corresponding processing method to implement a tradeoff between ACK/NACK information amount fed back and signal coverage are or CM value.

SUMMARY OF THE INVENTION

The objective of the present invention is to provide a method for feeding back ACK/NACK for downlink data transmission in a radio communication system, so as to enable data transmission based on Hybrid ARQ (HARQ) in the radio communication system.

In view of the above objective, embodiments of the present invention provide a method for feeding back ACK/NACK for downlink data transmission in the radio communication system. The method is applied on a mobile terminal and includes: receiving downlink data, calculating, with respect to each Compenent Carrier (CC), a number of ACKs of ACK/NACK information of downlink data sub-frames of the CC, and feeding back numbers of ACKs of the ACK/NACK information of downlink data sub-frames of CCs.

BRIEF DESCRIPTION OF THE DRAWINGS

The above objective, merits and features of the present invention will become obvious by referring to detailed description to preferred embodiments accompanying the following drawings, wherein.

DETAILED DESCRIPTION OF THE INVENTION

The present invention will be described in further detail hereinafter with reference to accompanying drawings and embodiments to make the objective, technical solution and merits therein clearer.

In the method for transmitting ACK/NACK information based on multi-code transmission, the more the ACK/NACK channels simultaneously used, the larger the value of the CM, and the smaller a maximum transmission power available for each ACK/NACK channel. Therefore, there is a tradeoff which allows a UE to transmit ACK/NACK information on at most two ACK/NACK channels simultaneously. One of the advantages is that when the UE is configured with 2 power amplifiers and 2 antennas, the UE actually can use different antennas to transmit the ACK/NACK information on different ACK/NACK channels, i.e., the signal transmitted on each antenna will have the single-carrier characteristic and thus the CM value will not increase.

As to each downlink CC, suppose data of M downlink sub-frames is transmitted in one uplink sub-frame. As to one sub-frame in one CC, when no MIMO is adopted for data transmission, 1 bit of ACK/NACK information is generated. When MIMO is adopted for data transmission, 2 bits of ACK/NACK information are generated. Also suppose that the UE detects downlink data on N CCs simultaneously. Thus, the ACK/NACK information that the UE needs to feed back is at most 2MN bits. When the values of M and N are both relative large, resources of multiple ACK/NACK channels will be occupied for feeding back the 2MN bits of ACK/NACK information, which is not good for decreasing CM value of the uplink signal and the uplink coverage. Therefore, the 2MN bits should be processed to decrease the uplink overhead. It is possible to adopt a method of bundling data of sub-frames in one CC, e.g. bundling the ACK/NACK information of CodeWords (CWs) having the same index in the sub-frames to obtain 1 or 2 bits. But since the DAI cannot find the situation where data of the last several sub-frames are lost, in order to enable the base station to recognize that the UE has bundled the ACK/NACK information of which sub-frames, it is not enough to only transmit the 2 bits, which will increase the overhead of the uplink feedback inevitably.

Figure 3:
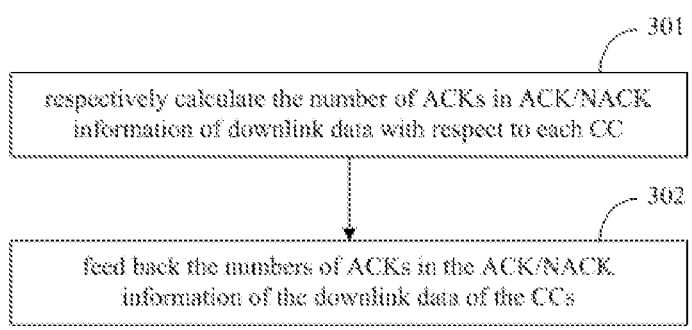
FIG. 3 is a flowchart illustrating a method for feeding back ACK/NACK with respect to downlink data transmission in the radio communication system according to an embodiment of the present invention.

FIG. 3 is a basic flowchart of the present invention. As shown in FIG. 3, the flowchart includes the following steps.

Step 301, respectively calculate the number of ACKs in ACK/NACK information of downlink data with respect to each CC.

When there is no SPS data in one CC, the number of the ACKs may be obtained by calculating a number of consecutive ACKs in the ACK/NACK information of the downlink data in an ascending order of the DAI from the downlink data scheduled by the PDCCH with DAI value of 1. One calculating method includes: as to one CC, perform a spatial bundling to the ACK/NACK information of each sub-frame to obtain 1 piece of ACK/NACK information, then calculate the number of consecutive ACKs of the ACK/NACK information of the downlink data in the ascending order of the DAI from the downlink data scheduled by the PDCCH with DAI value of 1. For example, the UE receives data of 4 sub-frames, and their ACK/NACK information is respectively ACK, ACK, NACK and ACK. The number of consecutive ACKs is 2. After receiving the information of the number of consecutive ACKs, the base station can know that the UE has correctly received the downlink data of consecutive sub-frames from the sub-frame where the PDCCH with DAI value of 1 is located, and thus re-transmits only the downlink data has not been correctly received. Another calculating method includes: do not perform spatial bundling to the ACK/NACK information of each sub-frame, calculate the number of consecutive ACKs of the ACK/NACK information of CWs in the ascending order of the DAI from the downlink sub-frame where the PDCCH with DAI value of 1 is located. Herein, it is possible to calculate the number of consecutive ACKs in an order of first CW0 and then CW1 in each sub-frame. Suppose the UE receives data of 3 sub-frames. The first sub-frame transmits two CWs adopting MIMO and the feedback information is both ACK. The second sub-frame transmits only one CW and the feedback is ACK. The third sub-frame transmits two sub-frames adopting MIMO and the feedback is ACK and NACK. Thus, the number of consecutive ACKs is 4. After receiving the information of the number of consecutive ACKs, the base station can know that the UE has correctly received the downlink data of how many CWs from the sub-frame where the PDCCH with DAI value of 1 is located, and therefore re-transmits only the downlink data has not been correctly received. As to the situation that there is no SPS, when the UE finds that the downlink data scheduled by the PDCCH with DAI value of 1 is lost, the number of consecutive ACKs is 0.

If there is SPS data in one CC, when calculating the number of consecutive ACKs, the ACK/NACK information in the sub-frames are sorted firstly. The ACK/NACK information of the SPS sub-frame is sorted in the first. Then sort the ACK/NACK information of the downlink data scheduled by the PDCCHs in the ascending order of the DAI from the PDCCH with DAI value of 1, and then calculate the number of consecutive ACKs. Similar to the situation that there is no SPS data, it is possible to obtain 1 piece of ACK/NACK information through spatial bundling to the ACK/NACK information of each sub-frame of one CC. Then calculate the number of consecutive ACKs of the ACK/NACK information of the downlink data in turn. Or, do not perform spatial bundling to the ACK/NACK information of each sub-frame. Instead, calculate the number of consecutive ACKs of the ACK/NACK information of the CWs. As to the situation that there is SPS, when the UE finds that the downlink data scheduled by the PDCCH with DAI value of 1 is lost, if the SPS data is corrected received, the number of consecutive ACKs is 1; otherwise, the number of consecutive ACKs is 0.

In addition, the calculation of the number of the ACKs may also be independent from the DAI value. Instead, it is possible to directly calculate the number of ACKs in the ACK/NACK information of the downlink data of one CC. One calculating method is as follows: as to one CC, 1 piece of ACK/NACK information is obtained through spatial bundling of the ACK/NACK information of each sub-frame. Then the number of the ACKs of the ACK/NACK information of the downlink data is calculated. For example, the UE receives data of 4 sub-frames, and their ACK/NACK information is respectively ACK, ACK, NACK and ACK, then the number of the ACKs is 3. After receiving the information of the number of the ACKs, if the number of the ACKs equals to the number of sub-frames in which the base station has transmitted data, the base station will know that the UE have correctly received all the downlink data transmitted; otherwise, the base station has to re-transmit all the downlink data. Another calculating method is as follows: do not perform spatial bundling to the ACK/NACK information of each sub-frame, calculate the number of ACKs of the ACK/NACK information of the CWs. For example, suppose the UE receives data of 3 sub-frames, the first sub-frame transmits 2 CWs adopting MIMO and the feedback information is both ACK. The second sub-frame transmits only one CW and the feedback information is NACK. The third sub-frame transmits 2 sub-frames adopting MIMO and the feedback information is ACK and NACK. Then the number of the ACKs is 3. After receiving the number of ACKs, if the number of the ACKs equals to the number of CWs in the sub-frames in which the base station has transmitted data, the base station will know that the UE has correctly received all the downlink data transmitted; otherwise, the base station has to re-transmit all the downlink data.

After calculating the number of the ACKs following the above method, it is possible to perform a multiple-to-one mapping to the number of the consecutive ACKs, so as to control the overhead of the feedback further. Suppose the number of downlink sub-frames M associated with the same uplink sub-frame is 4, the number of consecutive ACKs may be 0, 1, 2, 3 or 4. The 5 numbers may be mapped to 4 statuses, thus can be denoted by 2 bits. For example, the ACK number 2 and the ACK number 3 may be mapped to a same status, whereas the ACK numbers 0, 1 and 4 may be respectively mapped to other 3 statuses, so that they can be denoted by 2 bits. But adopting this multiple-to-one mapping method, the base station cannot differentiate that whether the ACK number fed back is 2 or 3. One possible manner is that the base station processes following the situation that the number of the consecutive ACKs is 2. Or, the base station may map the ACK number 3 and the ACK number 4 to the same status, whereas map the ACK numbers 0, 1 and 2 respectively to other 3 statuses, so as to denote the ACK numbers by 2 bits. But adopting this multiple-to-one mapping method, the base station cannot differentiate that whether the ACK number fed back is 3 or 4. One possible manner is that the base station processes following the situation that the number of the consecutive ACKs is 3. Or, the base station may map the ACK number 1 and the ACK number 4 to the same status, whereas map the ACK numbers 0, 2 and 3 respectively to other 3 statuses, so as to denote the ACK numbers by 2 bits. But adopting this multiple-to-one mapping method, the base station cannot differentiate that whether the ACK number fed back is 1 or 4. One possible manner is that the base station processes following the situation that the number of the consecutive ACKs is 4 when the base station actually has transmitted data of 4 sub-frames and processes following the situation that the number of the consecutive ACKs is 1 when the number of sub-frames that the base station actually transmitted is smaller than 4.

The above overlap mapping of the number of consecutive ACKs may be executed only when necessary. For example, according to the number and positions of the sub-frames of each downlink data received, the UE can analyze to obtain a maximum number of consecutive ACKs that may appear, so as to determine whether to adopt the multiple-to-one mapping method. For example, if the UE determines that the maximum number of consecutive ACKs that may appear is larger than 4, execute the multiple-to-one mapping. The ACK numbers 2 and 3 are mapped to the same status, whereas the ACK numbers 0, 1 and 4 are respectively mapped to other 3 statuses, so as to denote the numbers by 2 bits. When the UE determines that the maximum number of consecutive ACKs that may appear is smaller than or equal to 4, the multiple-to-one mapping will not be executed. Instead, the number of consecutive ACKs is denoted by 2 bits directly. As to some multiple-to-one mapping methods, e.g. the method of mapping the numbers 3 and 4 to the same status and mapping the numbers 0, 1 and 2 to other 3 statuses, when the number of possible consecutive ACKs is smaller than or equal to 4, they will naturally become a one-to-one mapping method.

Step 302, feed back the numbers of ACKs in the ACK/NACK information of the downlink data of the CCs. Herein, the step of feeding back the numbers of ACKs of the CCs may include: determining an ACK/NACK channel and a QAM symbol used for feeding back the ACK/NACK information of each CC according to the number of ACKs of the CC, and transmitting the number of ACKs. Or, the numbers of ACKs of all CCs may be jointly coded before being transmitted. Or, the numbers may be transmitted by other methods.

Figure 1:
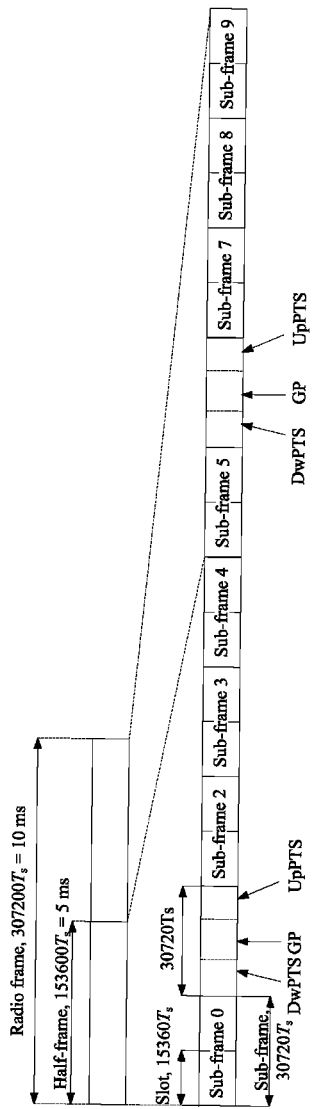
FIG. 1 is a schematic diagram illustrating a frame structure of LTE TDD.
Figure 2:
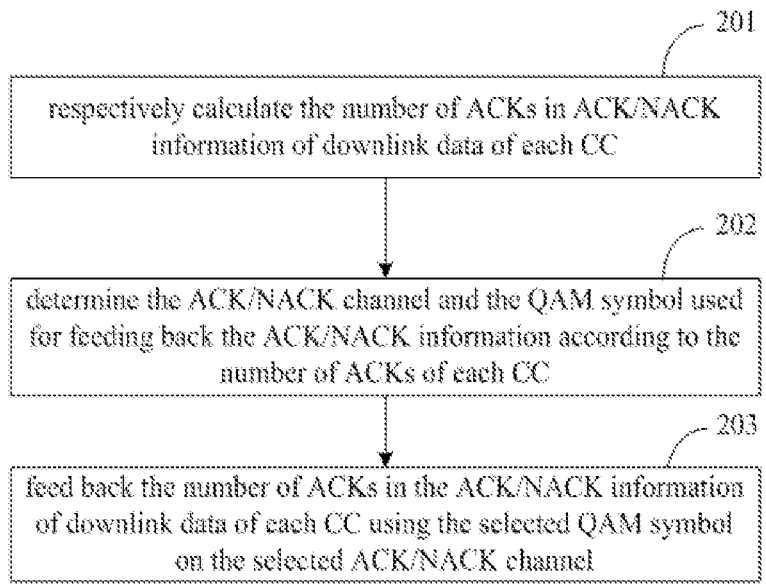
FIG. 2 is a flowchart illustrating a method for feeding back ACK/NACK based on ACK/NACK channel selection according to an embodiment of the present invention.

FIG. 2 is a basic flowchart illustrating a method for transmitting the number ACKs of each CC through selecting the ACK/NACK channel and the QAM symbol according to an embodiment of the present invention. As shown in FIG. 2, the flowchart includes the following steps.

Step 201, respectively calculate the number of ACKs in ACK/NACK information of downlink data of each CC. Herein, step 201 is the same as step 301 in FIG. 3.

Step 202, determine the ACK/NACK channel and the QAM symbol used for feeding back the ACK/NACK information according to the number of ACKs of each CC. Herein, one ACK/NACK channel and one QAM constellation point are defined to constitute one resource status.

Herein, it is possible to select the ACK/NACK channel the QAM symbol to be transmitted according to the number of consecutive ACKs of each CC. In addition, suppose the UE is able to transmit information on K ACK/NACK channels simultaneously, e.g. K=2. Thus, it is possible to select the K ACK/NACK channels and the QAM symbol to be transmitted on each of the selected ACK/NACK channels according to the number of consecutive ACKs of each CC. As to the situation of K channels, in order to decrease complexity, it is also possible to divide the number information of consecutive ACKs of the CCs into K groups, and select one ACK/NACK channel and a QAM symbol to be transmitted for each group of information.

As to each CC, the number of consecutive ACKs equals to k means that the UE knows indexes of at least k ACK/NACK channels. In particular, when there is no SPS service, the number of the consecutive ACKs equals to k means that the UE has received at least the PDCCHs with DAI values of 1, 2, . . . , k. Thus, the UE knows k ACK/NACK channels, i.e. the k ACK/NACK channels respectively correspond to the sub-frames of the PDCCHs with DAI values of 1, 2, . . . , k. When there is SPS service, the number of consecutive ACKs equals to k means that, besides the SPS data, the UE has received at least the PDCCHs with DAI values of 1, 2, . . . , k−s, wherein s is larger than or equal to 1. Thus, the UE knows at least k ACK/NACK channels, i.e. there are s ACK/NACK channels are ACK/NACK channels allocated to the SPS service semi-statically, and there are k−s ACK/NACK channels are respectively corresponding to sub-frames of the PDCCHs with DAI values of 1, 2, . . . , k−s. When determining the ACK/NACK channels which can be used for transmitting the ACK/NACK information, anyone of the k ACK/NACK channels may be used for feeding back the ACK/NACK information; or, it is possible to define a subset of the k ACK/NACK channels for feeding back the ACK/NACK information. For example, the number of consecutive ACKs may be denoted by 2 bits and two of the k ACK/NACK channels may be used for transmitting the ACK/NACK information. When there is no SPS service, the ACK/NACK channel where the PDCCH with DAI value of 1 and the PDCCH with DAI value of 2 are mapped may be used for ACK/NACK transmission. If there is SPS service, the semi-statically allocated ACK/NACK channel of the SPS data and the ACK/NACK channel where the PDCCH with DAI value of 1 is mapped are used for the ACK/NACK transmission.

Step 203, feed back the number of ACKs in the ACK/NACK information of downlink data of each CC using the selected QAM symbol on the selected ACK/NACK channel.

Hereinafter, several preferred embodiments will be described.

Suppose the UE receives data of N CCs simultaneously, there are M sub-frames on each CC, and the UE finally feeds back ACK/NACK information on one ACK/NACK channel.

Step 201, as to one CC, 1 piece of ACK/NACK information is obtained through spatial bundling of the ACK/NACK information in each sub-frame, and the number of consecutive ACKs is calculated.

Step 202, select one ACK/NACK channel and QAM symbol to be transmitted according to the number of consecutive ACKs of each CC. Herein, suppose when the number of consecutive ACKs of one CC equals to k, anyone of the k corresponding ACK/NACK channels may be used to feed back the ACK/NACK information.

Hereinafter, the situation that the UE needs to feed back ACK/NACK information of 2 CCs and M=4 on each CC is described. At this time, the number of consecutive ACKs on each CC may be 0, 1, 2, 3 or 4. Table 1 shows an example of mapping the ACK/NACK feedback information to resource statuses, wherein $n_{PUCCH}^{(1)}$ denotes an index of the ACK/NACK channel selected. The index of the ACK/NACK channel selected equals to the DAI value of the PDCCH corresponding to the ACK/NACK channel. The QPSK constellation points are denoted by two bits $b_0 b_1$. Herein, statuses 1-24 traverse all possible combinations of the numbers of consecutive ACKs of 2 CCs except for the feedback information whose numbers of consecutive ACKs are both 0. Statuses 24-32 are further extension to the feedback information of the 2 CCs whose numbers of consecutive ACKs are both 0. This is mainly used to realize to transmit no uplink signal (i.e. DTX) only when the UE does not receive any downlink data. As shown in Table 1, the number of available resource statuses exactly equals to the number of statuses need to be indicated. Herein, "CC#y, AN#x" denotes the ACK/NACK channel selected is the one where the PDCCH with DAI value of x on CC#y is mapped. "0 (Data x)" denotes that the DAI in the PDCCH corresponding to the first downlink data the UE receives is x, or the UE does not receive the data of the PDCCHs with DAI values of 1, 2, . . . , x−1, and the feedback information of the data scheduled by the PDCCH with DAI value of x is NACK. QPSK constellation points are noted by two bits b0 and b1. Table 1 only shows an example. Other ACK/NACK channel selection methods and constellation point allocation methods may also be adopted, which is not restricted by the present invention.

TABLE 1

Mapping table when M = 4

| | Number of consecutive ACKs | | | |
|---|---|---|---|---|
| Status | CC#0 | CC#1 | $n_{PUCCH}^{(1)}$ | b0, b1 |
| 1 | 0 | 1 | CC#2, AN#1 | 0, 0 |
| 2 | 0 | 2 | CC#2, AN#2 | 0, 0 |
| 3 | 0 | 3 | CC#2, AN#3 | 0, 0 |
| 4 | 0 | 4 | CC#2, AN#2 | 0, 1 |
| 5 | 1 | 0 | CC#1, AN#1 | 0, 0 |
| 6 | 1 | 1 | CC#1, AN#1 | 0, 1 |

TABLE 1-continued

Mapping table when M = 4

| Status | Number of consecutive ACKs | | $n_{PUCCH}^{(1)}$ | b0, b1 |
|---|---|---|---|---|
| | CC#0 | CC#1 | | |
| 7 | 1 | 2 | CC#2, AN#2 | 1, 0 |
| 8 | 1 | 3 | CC#2, AN#3 | 0, 1 |
| 9 | 1 | 4 | CC#2, AN#4 | 0, 1 |
| 10 | 2 | 0 | CC#2, AN#1 | 0, 1 |
| 11 | 2 | 1 | CC#1, AN#2 | 0, 0 |
| 12 | 2 | 2 | CC#1, AN#2 | 0, 1 |
| 13 | 2 | 3 | CC#2, AN#3 | 1, 0 |
| 14 | 2 | 4 | CC#2, AN#4 | 0, 0 |
| 15 | 3 | 0 | CC#1, AN#2 | 1, 0 |
| 16 | 3 | 1 | CC#1, AN#3 | 0, 0 |
| 17 | 3 | 2 | CC#1, AN#3 | 0, 1 |
| 18 | 3 | 3 | CC#1, AN#3 | 1, 0 |
| 19 | 3 | 4 | CC#2, AN#4 | 1, 0 |
| 20 | 4 | 0 | CC#1, AN#1 | 1, 0 |
| 21 | 4 | 1 | CC#2, AN#1 | 1, 0 |
| 22 | 4 | 2 | CC#1, AN#4 | 0, 0 |
| 23 | 4 | 3 | CC#1, AN#4 | 0, 1 |
| 24 | 4 | 4 | CC#1, AN#4 | 1, 0 |
| 25 | NACK (Data 1) | 0 | CC#1, AN#1 | 1, 1 |
| 26 | NACK (Data 2) | 0 | CC#1, AN#2 | 1, 1 |
| 27 | NACK (Data 3) | 0 | CC#1, AN#3 | 1, 1 |
| 28 | NACK (Data 4) | 0 | CC#1, AN#4 | 1, 1 |
| 29 | DTX | NACK (Data 1) | CC#2, AN#1 | 1, 1 |
| 30 | DTX | NACK (Data 2) | CC#2, AN#2 | 1, 1 |
| 31 | DTX | NACK (Data 3) | CC#2, AN#3 | 1, 1 |
| 32 | DTX | NACK (Data 4) | CC#2, AN#4 | 1, 1 |
| 33 | DTX | DTX | N/A | N/A |

In Table 2, it is supposed that the UE needs to feed back ACK/NACK information of 2 CCs and M=3 on each CC. Herein, it is further supposed that one of the 3 sub-frames on CC#0 transmits the SPS service, i.e. the SPS sub-frame transmits downlink data but has no PDCCH. Accordingly, dynamic downlink data of at most M−1=2 sub-frames may be transmitted on CC#0. In other words, the DAI value of the PDCCH is 1 or 2. As to CC#1, since there is no SPS service, the value of the DAI of the PDCCH may be 1, 2 and 3. As to CC#0, the ACK/NACK information of the SPS sub-frame is taken as the first ACK/NACK information. Then, sort the ACK/NACK information of downlink data scheduled by the PDCCHs in an ascending order of the DAI value from DAI=1, and calculate the number of consecutive ACKs. At this time, the number of consecutive ACKs on each CC may be 0, 1, 2 or 3. For example, table 2 shows an example of mapping ACK/NACK feedback information to resource statuses. Herein, statuses 1-15 traverse all possible combinations of the numbers of consecutive ACKs on the 2 CCs. Statuses 16-21 are further extension to the feedback information of the 2 CCs whose numbers of consecutive ACKs are both 0. This is mainly used to transmit no uplink signal (DTX) only when the UE does not receive any downlink data. Herein, "CC#0, AN#1" denotes that the selected ACK/NACK channel is the semi-statically allocated ACK/NACK channel of the SPS data on CC#0. "CC#0, AN#x" (x is larger than 1) denotes that the selected ACK/NACK channels is the one where the PDCCH with DAI value of x−1 on CC#0 is mapped. "CC#1, AN#x" denotes that the selected ACK/NACK channel is the one wherein the PDCCH with DAI value of x on CC#1 is mapped. As to CC#0, "0 (Data 1)" denotes that the UE receives the SPS data but the feedback information is NACK. As to the situation that the SPS service is configured on CC#0, "0 (Data x)" (x is larger than 1) is a status will never happen. As to CC#1, "0 (Data x)" denotes that the DAI of the PDCCH corresponding to the first downlink data the UE receives is x, or the UE does not receive the data of the PDCCHs with DAI values of 1, 2, ..., x−1, and the feedback information of the data scheduled by the PDCCH with DAI value of x is NACK. The QPSK constellation points are denoted by two bits b0 and b1. Table 2 only shows an example. Other ACK/NACK channel selection methods and constellation point allocation methods may also be adopted, which is not restricted by the present invention.

TABLE 2 mapping table when there is SPS and M = 3

| Status | Number of consecutive ACKs | | $n_{PUCCH}^{(1)}$ | b0, b1 |
|---|---|---|---|---|
| | CC#0 | CC#1 | | |
| 1 | 0 | 1 | CC#1, AN#1 | 0, 0 |
| 2 | 0 | 2 | CC#1, AN#2 | 0, 0 |
| 3 | 0 | 3 | CC#1, AN#1 | 0, 1 |
| 4 | 1 | 0 | CC#0, AN#1 | 0, 0 |
| 5 | 1 | 1 | CC#1, AN#1 | 1, 0 |
| 6 | 1 | 2 | CC#1, AN#2 | 0, 1 |
| 7 | 1 | 3 | CC#1, AN#3 | 0, 0 |
| 8 | 2 | 0 | CC#0, AN#2 | 0, 0 |
| 9 | 2 | 1 | CC#0, AN#2 | 0, 1 |
| 10 | 2 | 2 | CC#0, AN#2 | 1, 0 |
| 11 | 2 | 3 | CC#1, AN#2 | 1, 0 |
| 12 | 3 | 0 | CC#0, AN#1 | 0, 1 |
| 13 | 3 | 1 | CC#0, AN#1 | 1, 0 |
| 14 | 3 | 2 | CC#0, AN#3 | 0, 0 |
| 15 | 3 | 3 | CC#0, AN#3 | 0, 1 |
| 16 | NACK (Data 1) | 0 | CC#0, AN#1 | 1, 1 |
| 17 | NACK (Data 2) | 0 | CC#0, AN#2 | 1, 1 |
| 18 | NACK (Data 3) | 0 | CC#0, AN#3 | 1, 1 |
| 19 | DTX | NACK (Data 1) | CC#1, AN#1 | 1, 1 |
| 20 | DTX | NACK (Data 2) | CC#1, AN#2 | 1, 1 |
| 21 | DTX | NACK (Data 3) | CC#1, AN#3 | 1, 1 |
| 22 | DTX | DTX | N/A | N/A |

It should be noted that, since the UE receives at least SPS server data on CC#0, no other statuses with DTXs differentiated need to be indicated exists, i.e., statuses 17 and 18 are unnecessary. The objective that table 2 keeps the statuses 17 and 18 is to make the table being applicable also for situations that there is no SPS. At this time, "CC#y, AN#x" denotes that the selected ACK/NACK channel is the one where the PDCCH with DAI value of x on CC#y is mapped. "0 (Data x)" denotes that the DAI of the PDCCH corresponding to the first downlink data that the UE receives is x, or the UE does not receive the data of the PDCCHs with DAI values of 1, 2, ..., x−1, and the feedback information of the data scheduled by the PDCCH with DAI value of x is NACK. The analysis herein is also applicable for table 1, i.e. table 1 is also applicable for the situation that there is SPS service.

Suppose that the UE receives data of N CCs simultaneously. When N is relatively large, the amount of ACK/NACK information needs to be fed back is relatively large, and one ACK/NACK channel is not enough for indicating so much feedback information. At this time, it is possible to occupy two ACK/NACK channels to feed back the ACK/NACK information.

Step 201, as to one CC, obtain 1 piece of ACK/NACK information through spatial bundling to the ACK/NACK information of each sub-frame, and calculate the number of consecutive ACKs.

Step 202, select two ACK/NACK channels and QAM symbols to be transmitted according to the number of consecutive ACKs of each CC. Herein, it is supposed that when the number of consecutive ACKs on one CC is k, any ACK/NACK channels among k corresponding ACK/NACK channels may be used to feed back the ACK/NACK information.

Herein, when defining the mapping relationship between the numbers of consecutive ACKs of the CCs and the resource statuses, it is possible to directly select two ACK/NACK channels and the corresponding QAM symbols from the candidate ACK/NACK channels of the N CCs, which is favorable for avoiding overlap mapping of the ACK/NACK information to the resource statuses of each CC but the complexity is very high.

In order to decrease the complexity of mapping the ACK number information of the CC to the resource statuses, the information of the numbers of consecutive ACKs of the N CCs may be divided into two groups. Then, an ACK/NACK channel is selected to indicate each group of feedback information. Herein, when N is an even number, the information may be equally divided into 2 groups, i.e. each group includes information of the numbers of consecutive ACKs of N/2 CCs; when N is an odd number, it is possible to make each group respectively include information of the numbers of consecutive ACKs of ceil (N/2) CCs and floor (N/2) CCs, or make each group respectively include information of the numbers of consecutive ACKs of floor (N/2) CCs and divide the information of the number of consecutive ACKs of the remained CC into two parts and respectively transmit the two parts in two groups. Ceil is a round-up function and floor is a round-down function. Herein, a first method for dividing the consecutive ACK information of one CC into two parts is as follows: suppose one CC includes M sub-frames, divide the M sub-frames into two sets which respectively include ceil (M/2) or floor (M/2) sub-frames, so that the two groups of feedback information respectively include the consecutive ACK number of one set. A second method for dividing the consecutive ACK number information of one CC includes: express the consecutive ACK number information of the CC by 2 bits, each group of feedback information respectively include 1 bit. Herein, when M=4, there are 5 possible values for the number of consecutive ACKs, i.e. 0, 1, 2, 3 and 4. The multiple-to-one mapping method may be adopted to express the 4 statuses by 2 bits.

Suppose the UE receives data of 4 CCs simultaneously. The feedback information of the 4 CCs may be divided into 2 groups equally. For example, the first group includes the consecutive ACK numbers of CC#0 and CC#1. Accordingly, the second group includes the consecutive ACK numbers of CC#2 and CC#3. Thus, suppose M=4, the method shown in table 1 may be adopted to complete the mapping of the ACK/NACK information to the resource statuses for each group of feedback information. Suppose M=3, the method shown in table 2 may be adopted to complete the mapping of the ACK/NACK information to the resource statuses for each group of feedback information.

Suppose the UE receives data of N=5 CCs simultaneously and M=2 on each CC, i.e. the consecutive ACK number on each CC may be 0, 1 or 2 which can be denoted by 2 bits adopting, e.g. the method shown in table 3. As to the mapping method in table 3, when there is no SPS service, it is possible to make bit $b_i$ to be corresponding to the ACK/NACK channel where the PDCCH with DAI value of i+1 is mapped. When there is SPS service, bit b0 may be corresponding to the ACK/NACK channel of the SPS service and bit b1 may be corresponding to the ACK/NACK channel with DAI value of 1. Thus, when bit $b_i$ is 1, i=0,1, it is ensured that there is an ACK/NACK channel corresponds to the bit $b_i$. When bit $b_i$ is 0, there may be no ACK/NACK channel corresponding to the bit $b_i$. At this time, the feedback information of the 5 CCs is divided into two groups. For example, respectively transmit the two bits of feedback information of CC#4 in two groups, then the first group includes the consecutive ACK numbers of CC#0 and CC#1 and bit b0 of CC#4. Accordingly, the second group includes the consecutive ACK numbers of CC#2 and CC#3 and bit b1 of CC#4. Hereinafter, it is required to define a mapping relationship of the ACK/NACK information in each group of feedback information to the resource status. Since the two groups have similar structures, the same method may be adopted. Hereinafter, only the mapping method of the first group is illustrated as an example.

TABLE 3

Method for mapping 2 bits

| Number of consecutive ACKs | b0 | b1 |
|---|---|---|
| 0 | 0 | 0 |
| 1 | 1 | 0 |
| 2 | 0 | 1 |
| 3 | 1 | 1 |

As shown in table 4, the number of values of the consecutive ACK numbers of the first two CCs is 3, the number of values of bit b0 of CC#4 is 2, i.e. the number of statuses is 3*3*2=18. In order to differentiate DTX statuses, the feedback information of all zeros is further divided into 5 statuses, i.e. the total number of required statuses is 18+5−1=22. But since there are only 2+2+1=5 ACK/NACK channels are available and the total number of statuses they can provide is 5*4=20, it is smaller than the number of statuses required. This can be solved by the multiple-to-one mapping. In table 4, status 2 and status 3 are mapped to the same resource status (CC#1, AN#1), status 15 and status 16 are mapped to the same resource status (CC#0, AN#2). Table 4 only shows an example. Other ACK/NACK channel selection methods and constellation point allocation methods may be adopted, which is not restricted by the present invention.

TABLE 4

Mapping table when there are 5 CCs

| | Number of consecutive ACKs | | | | |
|---|---|---|---|---|---|
| status | CC#0 | CC#1 | CC#4, b0 | $n_{PUCCH}^{(1)}$ | b0, b1 |
| 1 | 0 | 1 | 0 | CC#1, AN#1 | 0, 0 |
| 2 | 0 | 2 | 0 | CC#1, AN#1 | 0, 1 |
| 3 | 1 | 0 | 0 | CC#0, AN#1 | 0, 0 |
| 4 | 1 | 1 | 0 | CC#1, AN#2 | 0, 0 |
| 5 | 1 | 2 | 0 | CC#1, AN#1 | 0, 1 |
| 6 | 2 | 0 | 0 | CC#0, AN#2 | 0, 0 |
| 7 | 2 | 1 | 0 | CC#0, AN#2 | 0, 1 |
| 8 | 2 | 2 | 0 | CC#1, AN#2 | 0, 1 |
| 9 | 0 | 0 | 1 | CC#4, AN#1 | 0, 0 |
| 10 | 0 | 1 | 1 | CC#1, AN#1 | 1, 0 |
| 11 | 0 | 2 | 1 | CC#1, AN#2 | 1, 0 |
| 12 | 1 | 0 | 1 | CC#4, AN#1 | 0, 1 |
| 13 | 1 | 1 | 1 | CC#0, AN#1 | 0, 1 |
| 14 | 1 | 2 | 1 | CC#4, AN#1 | 1, 0 |
| 15 | 2 | 0 | 1 | CC#0, AN#2 | 1, 0 |
| 16 | 2 | 1 | 1 | CC#0, AN#2 | 1, 0 |
| 17 | 2 | 2 | 1 | CC#0, AN#1 | 1, 0 |
| 18 | NACK (Data 1) | 0 | 0 | CC#0, AN#1 | 1, 1 |
| 19 | NACK (Data 2) | 0 | 0 | CC#0, AN#2 | 1, 1 |
| 20 | DTX | NACK (Data 1) | 0 | CC#1, AN#1 | 1, 1 |
| 21 | DTX | NACK (Data 2) | 0 | CC#1, AN#2 | 1, 1 |
| 22 | DTX | DTX | NACK | CC#4, AN#1 | 1, 1 |
| 23 | DTX | DTX | DTX | N/A | N/A |

If the requirement to the DTX is loosed, e.g. when there is no SPS service, the situation that the UE loses the data scheduled by the PDCCH with DAI value of 1 will be treated as DTX. At this time, the number of available resource statuses exactly equals to the number of statuses need to be indicated, as shown in table 5. Similarly, table 5 only shows an example. Other ACK/NACK channel selection methods and constellation point allocation methods may be adopted, which is not restricted by the present invention.

TABLE 5

Mapping table when there are 5 CCs

| status | Number of consecutive ACKs | | | $n_{PUCCH}^{(1)}$ | b0, b1 |
|---|---|---|---|---|---|
| | CC#0 | CC#1 | CC#4, b0 | | |
| 1 | 0 | 1 | 0 | CC#1, AN#1 | 0, 0 |
| 2 | 0 | 2 | 0 | CC#1, AN#1 | 0, 1 |
| 3 | 1 | 0 | 0 | CC#0, AN#1 | 0, 0 |
| 4 | 1 | 1 | 0 | CC#1, AN#2 | 0, 0 |
| 5 | 1 | 2 | 0 | CC#1, AN#2 | 0, 1 |
| 6 | 2 | 0 | 0 | CC#0, AN#2 | 0, 0 |
| 7 | 2 | 1 | 0 | CC#0, AN#2 | 0, 1 |
| 8 | 2 | 2 | 0 | CC#1, AN#2 | 1, 0 |
| 9 | 0 | 0 | 1 | CC#4, AN#1 | 0, 0 |
| 10 | 0 | 1 | 1 | CC#1, AN#1 | 1, 0 |
| 11 | 0 | 2 | 1 | CC#1, AN#2 | 1, 1 |
| 12 | 1 | 0 | 1 | CC#4, AN#1 | 0, 1 |
| 13 | 1 | 1 | 1 | CC#0, AN#1 | 0, 1 |
| 14 | 1 | 2 | 1 | CC#4, AN#1 | 1, 0 |
| 15 | 2 | 0 | 1 | CC#0, AN#2 | 1, 0 |
| 16 | 2 | 1 | 1 | CC#0, AN#2 | 1, 1 |
| 17 | 2 | 2 | 1 | CC#0, AN#1 | 1, 0 |
| 18 | NACK (Data 1) | 0 | 0 | CC#0, AN#1 | 1, 1 |
| 19 | DTX | NACK (Data 1) | 0 | CC#1, AN#1 | 1, 1 |
| 20 | DTX | DTX | NACK | CC#4, AN#1 | 1, 1 |
| 21 | DTX | DTX | DTX | N/A | N/A |

As to the situation that the number of CCs N=5, the mapping tables when M=3 and M=4 may be obtained by the method similar to that when M=2. Similarly, since the number of available resource statuses is limited, the multiple-to-one mapping method may be adopted to obtain the mapping relationship between the ACK/NACK information and the resource statuses when M=3 and M=4.

In addition, suppose the UE receives data of 3 CCs at the same time and M=3. The feedback information of the 3 CCs is divided into two groups. And suppose the feedback information of CC#2 is respectively transmitted in two groups. Thus, the first group may include the number of consecutive ACKs of CC#0 and the number of consecutive ACKs of the first two sub-frames of CC#1. Accordingly, the second group may include the number of consecutive ACKs in the last sub-frame of CC#1 and the number of consecutive ACKs of CC#2. Herein, since the feedback information of CC#2 is transmitted in two groups, as to the sub-frames belonging to the first group, the above method is adopted to calculate the number of consecutive ACKs. And as to the sub-frames in the second group, when it is found according to the DAI that no data is lost in the sub-frames belonging to the first group, calculate the number of consecutive ACKs of dynamic data if there is no SPS service, calculate the number of consecutive ACKs of the SPS data and the dynamic data if there is SPS service. If it is found according to the DAI that there is data lost in the sub-frames belonging to the first group, calculate only the number of consecutive ACKs of the SPS data. As to the sub-frames of CC#2 in the first group, a corresponding candidate ACK/NACK channel is obtained according to the PDCCH corresponding to the consecutive ACKs. Similarly, as to the sub-frames of CC#2 belonging to the second group, a corresponding candidate ACK/NACK channel is also obtained according to the PDCCH corresponding to the consecutive ACKs.

Hereinafter, it is required to define the mapping relationship of the ACK/NACK information in each group of feedback information to the resource statuses. For example, as to the first group of feedback information, the possible values of the number of consecutive ACKs on CC#0 include 0, 1, 2 and 3. And the number of consecutive ACKs of sub-frames on CC#2 belonging to the first group may be 0, 1 and 2. As shown in table 6 which is a mapping example of this situation. As to the second group of feedback information, the possible values of the number of consecutive ACKs on the CC#1 include 0, 1, 2 and 3. And the number of consecutive ACKs of sub-frames on CC#2 belonging to the second group may be 0 and 1. As shown in table 7, it is an example showing this situation. In table 7, "CC#2, AN#1" is a candidate ACK/NACK channel of the sub-frame of CC#2 belonging to the second group. It is an ACK/NACK channel of SPS service, or the DAI value in the PDCCH corresponding to it depends on the consecutive ACK number of the sub-frames of CC#2 in the first group. Table 6 and table 7 only show examples. Other ACK/NACK channel selection methods and constellation point allocation methods may be adopted, which is not restricted by the present invention.

TABLE 6

Mapping table of the first group of feedback information when N = 3

| status | Number of consecutive ACKs | | $n_{PUCCH}^{(1)}$ | b0, b1 |
|---|---|---|---|---|
| | CC#0 | CC#2 | | |
| 1 | 0 | 1 | CC#2, AN#1 | 0, 0 |
| 2 | 0 | 2 | CC#2, AN#2 | 0, 0 |
| 3 | 1 | 0 | CC#0, AN#1 | 0, 0 |
| 4 | 1 | 1 | CC#2, AN#1 | 1, 0 |
| 5 | 1 | 2 | CC#2, AN#2 | 1, 0 |
| 6 | 2 | 0 | CC#0, AN#2 | 0, 0 |
| 7 | 2 | 1 | CC#0, AN#2 | 1, 0 |
| 8 | 2 | 2 | CC#0, AN#2 | 0, 1 |
| 9 | 3 | 0 | CC#0, AN#1 | 1, 0 |
| 10 | 3 | 1 | CC#0, AN#1 | 0, 1 |
| 11 | 3 | 2 | CC#0, AN#3 | 0, 0 |
| 12 | NACK (Data 1) | 0 | CC#0, AN#1 | 1, 1 |
| 13 | NACK (Data 2) | 0 | CC#0, AN#2 | 1, 1 |
| 14 | NACK (Data 3) | 0 | CC#0, AN#3 | 0, 1 |
| 15 | DTX | NACK (Data 1) | CC#2, AN#1 | 0, 1 |
| 16 | DTX | NACK (Data 2) | CC#2, AN#2 | 0, 1 |
| 17 | DTX | DTX | N/A | N/A |

TABLE 7

Mapping table of the second group of feedback information when N = 3

| status | Number of consecutive ACKs | | $n_{PUCCH}^{(1)}$ | b0, b1 |
|---|---|---|---|---|
| | CC#1 | CC#2 | | |
| 1 | 0 | 1 | CC#2, AN#1 | 0, 0 |
| 3 | 1 | 0 | CC#1, AN#1 | 0, 0 |
| 4 | 1 | 1 | CC#2, AN#1 | 0, 1 |
| 6 | 2 | 0 | CC#1, AN#2 | 0, 0 |
| 7 | 2 | 1 | CC#1, AN#2 | 0, 1 |
| 9 | 3 | 0 | CC#1, AN#1 | 1, 0 |
| 10 | 3 | 1 | CC#1, AN#3 | 0, 0 |
| 12 | NACK (Data 1) | 0 | CC#1, AN#1 | 1, 1 |
| 13 | NACK (Data 2) | 0 | CC#1, AN#2 | 1, 1 |
| 14 | NACK (Data 3) | 0 | CC#1, AN#3 | 1, 1 |
| 15 | DTX | NACK (Data 1) | CC#2, AN#1 | 1, 1 |
| 16 | DTX | DTX | N/A | N/A |

In fact, the possible feedback information of the two groups of ACK/NACK information when N=3 is a subset of the all possible feedback information when N=2 and M=3 on each CC. Therefore, table 6 and table 7 may be also not designed independently, but obtained from table 2. At this time, a corresponding row in table 2 may be used according to the feedback information actually exists. This feature is applicable for many different combinations of M and N, so as to simplify the design.

Figure 4:
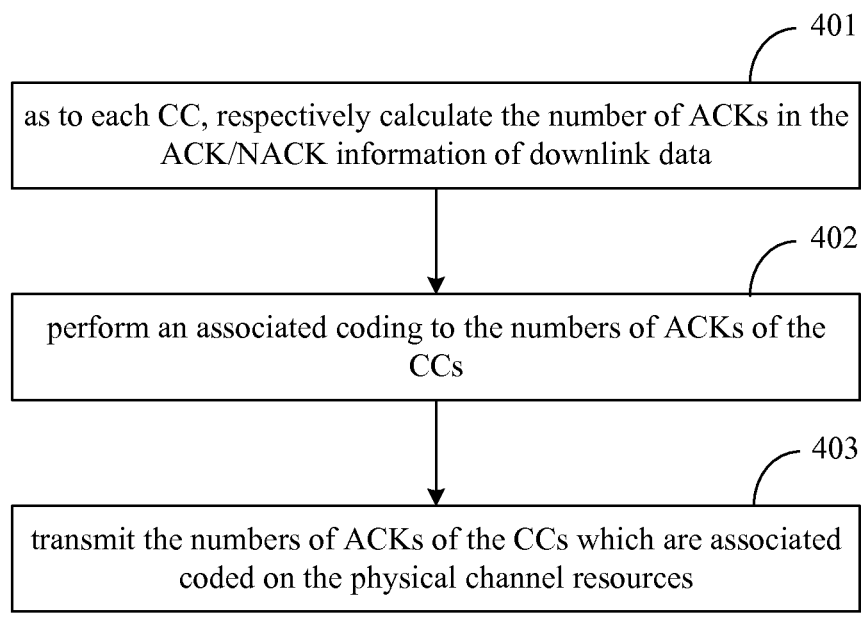
FIG. 4 is a flowchart illustrating a method for feeding back ACK/NACK based on associated coding according to an embodiment of the present invention.

FIG. 4 is a basic flowchart illustrating a method for transmitting ACK number of each CC through associated coding according to an embodiment of the present invention. As shown in FIG. 4, method includes the following steps.

Step 401, as to each CC, respectively calculate the number of ACKs in the ACK/NACK information of downlink data. Herein, step 401 is the same as step 301 shown in FIG. 3.

Step 402, perform an associated coding to the numbers of ACKs of the CCs.

Herein, the ACK number of each CC may be expressed by n (e.g. n=2) bits. Thus, the total number of bits of the numbers of ACKs of N CCs is B=n·N. Then, denote the number of channel bits of physical channel resources is G. Perform a channel coding to the B bits to obtain G coded bits. Or, it is possible to denote the numbers of ACKs of the CCs as M bits in association. For example, denote the number of possible values of the ACK number of each CC by k, the number of CCs is N. Thus, the total possible numbers of the ACKs of the N CCs is $k^N$. Accordingly, the number of bits for expressing the $k^N$ values is B=$\log_2(k^N)$=N·$\log_2(k)$. Hereinafter, denote the number of channel bits of physical channel resources is G, then G coded bits may be obtained through channel coding to the B bits.

It should be noted that, the physical channel resources used for transmitting the ACK number of each CC may include only one physical channel or may consist multiple physical channels. The physical channel resources herein may be configured semi-statically by higher-layer or indicated dynamically through physical control channel. For example, each physical channel may use the structure of PUCCH format 2 channel (i.e. CQI channel) defined in the LTE system. The channel coding may adopt the method for coding CQI information in the LTE system or other methods such as convolution coding.

Step 403, transmit the numbers of ACKs of the CCs which are associated coded on the physical channel resources.

Hereinafter, two preferred embodiments of the present invention will be described. The ACK number fed back on each CC may be the consecutive ACK number of downlink data that the UE receives on the CC or the total number of ACKs of downlink data that the UE receives on the CC.

First, an example that the consecutive ACK number information of the CCs is transmitted on one PUCCH format 2 channel is described. Suppose the UE needs to feed back ACK/NACK information of 5 CCs and M=4 on each CC. At this time, the consecutive ACK number on each CC may be 0, 1, 2, 3 and 4. There are 5 possible values. Thus, a total number of possible consecutive ACK numbers of the 5 CCs is $5^{5=3125}$ which needs to be expressed by 12 bits. In the LTE system, the method for perform channel coding to the CQI is able to support the transmission of at most 13 bits. Therefore, the method for performing channel coding in the LTE system may be directly used for coding the 12 bits. Then the coded bits are transmitted on the PUCCH format 2 channel. Suppose the UE needs to feed back ACK/NACK information of 5 CCs and M=2 on each CC. At this time, the consecutive ACK number on each CC may be 0, 1 and 2. There are 3 values altogether. Thus, the total number of possible consecutive ACK numbers on the 5 CCs is $5^{3=125}$ which needs to be expressed by 7 bits. The channel coding method in the LTE system may also be directly used to coding the 7 bits. Then, the coded bits are transmitted on the PUCCH format 2 channel.

Secondly, an example that the consecutive ACK number information of the CCs is transmitted on two PUCCH format 2 channels is described. Suppose the UE needs to feed back ACK/NACK information of 5 CCs and M=4 on each CC. At this time, the consecutive ACK number of each CC may be 0, 1, 2, 3 and 4. There are 5 values altogether. Thus, the total number of possible consecutive ACK numbers of the 5 CCs is $5^{5=3125}$ which needs to be expressed by 12 bits. Hereinafter, the channel coding method to the CQI in the LTE system may be used to code the 12 bits of information. Then, the coded bits are transmitted on the two PUCCH format 2 channels. Or, denote the total physical channel bit number of the two PUCCH format 2 channels is G Then, G physical bits may be obtained through performing channel coding to the 12 bits. And then the coded bits are mapped to the two PUCCH format 2 channels for transmission. The channel coding herein may be convolution coding or other coding methods.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

What is claimed is:

1. A method for transmitting an ACK/NACK signal for data of two configured serving cells, the method comprising:
   receiving a plurality of physical downlink shared channels (PDSCHs);
   mapping ACK/NACK bits; and
   transmitting the ACK/NACK signal based on the ACK/NACK bits on at least one of a physical uplink control channel (PUCCH) resource selected from a plurality of PUCCH resources for the two configured serving cells,
   wherein the mapping comprises:
   mapping, if there is a PDSCH without a corresponding physical downlink control channel (PDCCH), ACK/NACK for the PDSCH without the corresponding PDCCH at a bit 0 and ACK/NACK for a PDSCH with a corresponding PDCCH at a bit corresponding to a downlink assignment index (DAI) value in the corresponding PDCCH.

2. The method of claim 1, wherein the mapping comprises:
   mapping, if there is no PDSCH without a corresponding PDCCH, ACK/NACK for a PDSCH with a corresponding PDCCH at a bit corresponding to a DAI value in the corresponding PDCCH.

3. The method of claim 2, wherein the ACK/NACK bits are ordered in an ascending order of the DAI value in the corresponding PDCCH.

4. The method of claim 1, wherein the at least one of the PUCCH resource is allocated for each cell of the two configured serving cells.

5. The method of claim 1, wherein the plurality of PUCCH resources comprises PUCCH resources of indices 0 and 1 corresponding to a first serving cell and PUCCH resources of indices 2 and 3 corresponding to a secondary serving cell.

6. The method of claim 1, wherein the ACK/NACK bits are ordered in an ascending order of the DAI value in the corresponding PDCCH.

7. A method for receiving an ACK/NACK signal for data of two configured serving cells, the method comprising:

transmitting a plurality of physical downlink shared channels (PDSCHs); and receiving the ACK/NACK signal based on ACK/NACK bits on at least one of a physical uplink control channel (PUCCH) resource selected from a plurality of PUCCH resources for the two configured serving cells, wherein, if there is a PDSCH without a corresponding physical downlink control channel (PDCCH), ACK/NACK for the PDSCH without the corresponding PDCCH is mapped at a bit 0 and ACK/NACK for a PDSCH with a corresponding PDCCH is mapped at a bit corresponding to a downlink assignment index (DAI) value in the corresponding PDCCH.

8. The method of claim 7, wherein, if there is no PDSCH with a corresponding PDCCH, ACK/NACK for a PDSCH with a corresponding PDCCH is mapped at a bit corresponding to a DAI value in the corresponding PDCCH.

9. The method of claim 8, wherein the ACK/NACK bits are ordered in an ascending order of the DAI value in the corresponding PDCCH.

10. The method of claim 7, further comprising:
allocating the at least one of the PUCCH resource for each cell of the two configured serving cells.

11. The method of claim 7, wherein the plurality of PUCCH resources comprises PUCCH resources of indices 0 and 1 corresponding to a first serving cell and PUCCH resources of indices 2 and 3 corresponding to a secondary serving cell.

12. The method of claim 7, wherein the ACK/NACK bits are ordered in an ascending order of the DAI value in the corresponding PDCCH.

13. An apparatus for transmitting an ACK/NACK signal for data of two configured serving cells, the apparatus comprising:
a transceiver configured to transmit and receive data; and
a controller configured to control to receive a plurality of physical downlink shared channels (PDSCHs), to map ACK/NACK bits and to transmit the ACK/NACK signal based on the ACK/NACK bits on at least one of a physical uplink control channel (PUCCH) resource selected from a plurality of PUCCH resources for the two configured serving cells, wherein the controller is further configured to control to map, if there is a PDSCH without a corresponding physical downlink control channel (PDCCH), ACK/NACK for the PDSCH without the corresponding PDCCH at a bit 0 and ACK/NACK for a PDSCH with a corresponding PDCCH at a bit corresponding to a downlink assignment index (DAI) value in the corresponding PDCCH.

14. The apparatus of claim 13, wherein the controller is further configured to control to map, if there is no PDSCH without a corresponding PDCCH, ACK/NACK for a PDSCH with a corresponding PDCCH at a bit corresponding to a DAI value in the corresponding PDCCH.

15. The apparatus of claim 14, wherein the ACK/NACK bits are ordered in an ascending order of the DAI value in the corresponding PDCCH.

16. The apparatus of claim 13, wherein the at least one of the PUCCH resource is allocated for each cell of the two configured serving cells.

17. The apparatus of claim 13, wherein the plurality of PUCCH resources comprises PUCCH resources of indices 0 and 1 corresponding to a first serving cell and PUCCH resources of indices 2 and 3 corresponding to a secondary serving cell.

18. The apparatus of claim 13, wherein the ACK/NACK bits are ordered in an ascending order of the DAI value in the corresponding PDCCH.

19. An apparatus for receiving an ACK/NACK signal for data of two configured serving cells, the apparatus comprising:
a transceiver configured to transmit and receive data; and
a controller configured to control to transmit a plurality of physical downlink shared channels (PDSCHs) and to receive the ACK/NACK signal based on ACK/NACK bits on at least one of a physical uplink control channel (PUCCH) resource selected from a plurality of PUCCH resources for the two configured serving cells, wherein, if there is a PDSCH without a corresponding physical downlink control channel (PDCCH), ACK/NACK for the PDSCH without the corresponding PDCCH is mapped at a bit 0 and ACK/NACK for a PDSCH with a corresponding PDCCH is mapped at a bit corresponding to a downlink assignment index (DAI) value in the corresponding PDCCH.

20. The apparatus of claim 19, wherein, if there is no PDSCH with a corresponding PDCCH, ACK/NACK for a PDSCH with a corresponding PDCCH is mapped at a bit corresponding to a DAI value in the corresponding PDCCH.

21. The apparatus of claim 20, wherein the ACK/NACK bits are ordered in an ascending order of the DAI value in the corresponding PDCCH.

22. The apparatus of claim 19, wherein the controller is further configured to control to allocate the at least one of the PUCCH resource for each cell of the two configured serving cells.

23. The apparatus of claim 19, wherein the plurality of PUCCH resources comprises PUCCH resources of indices 0 and 1 corresponding to a first serving cell and PUCCH resources of indices 2 and 3 corresponding to a secondary serving cell.

24. The apparatus of claim 19, wherein the ACK/NACK bits are ordered in an ascending order of the DAI value in the corresponding PDCCH.

* * * * *